Patented Nov. 19, 1935

2,021,567

UNITED STATES PATENT OFFICE 2,021,567

CATALYST AND PROCESS OF HYDROGENATING ORGANIC COMPOUNDS

Anthony M. Muckenfuss, Niagara Falls, N. Y., assignor, by mesne assignments, to E. I. du Pont de Nemours and Company, a corporation of Delaware No Drawing. Application November 6, 1931,
Serial No. 573,514

11 Claims. (Cl. 260—168)

This invention relates to the hydrogenation of organic compounds and catalysts therefor. More particularly, it concerns the preparation and use of new organo-metallic compositions as catalysts in hydrogenating organic compounds.

Various inorganic catalysts for the hydrogenation of organic compounds have been known. Examples of such catalysts are platinum, nickel, nickel oxide, palladium, electrolytic iron, alkali metals and alkali metal hydrides. Such catalysts are either expensive or difficult to prepare and their catalytic activity decreases, or may be entirely destroyed, during use. They often have the disadvantage of carrying the hydrogenation farther than that desired.

An object of this invention is the preparation of new compositions from an alkali metal and a hydrocarbon, especially an aromatic hydrocarbon, and the use of such compositions as catalysts in the hydrogenation of organic compounds, especially hydrogenation of aromatic hydrocarbons. A further object is a process of continuously hydrogenating hydrocarbons without the necessity of replacing or renewing the catalyst. Another object of this invention is the preparation and use of hydrogenation catalysts which are not poisoned, as by the presence of sulphur compounds. A further object is to prepare catalysts whose activity and stability increase during use and which can be used at temperatures relatively lower than is possible with other hydrogenation catalysts, such as alkali metal or alkali metal hydride. Another object of this invention is the preparation of an inexpensive catalyst, small amounts of which may be used in the hydrogenation of large quantities of aromatic hydrocarbons.

The above objects are accomplished by this invention through the preparation of, and use as catalysts, of the compositions resulting from the action of an alkali metal upon a hydrocarbon, especially an aromatic hydrocarbon having more than one benzene nucleus in the molecule, at temperatures high enough and for a period of time long enough to cause the formation of complex organo-metallic compositions. The hydrocarbon reacted with alkali metal may be in either its simple form or in its polymeric condensed form, since the action of alkali metal on the simple hydrocarbons causes formation of polymers. These, however, are then able to react to form my complex organo-metallic compositions, providing the action of alkali metal is continued long enough, and at the necessary temperatures. For convenience, these complex organo-metallic compositions I have designated herein as "hydrocarbides", although I do not desire to be restricted to any theory as to composition which might be inferred from this name. The hydrocarbides of this invention are not the simple organo-metallic compounds produced at the ordinary room temperature or at comparatively low temperatures by the reaction of an alkali metal upon an aromatic hydrocarbon, since the hydrocarbides of my invention, although they may be made from the same starting materials, are formed under different conditions and generally at higher temperatures than these simple compounds, and possess different properties, chiefly in that they are hydrogenation catalysts, whereas the corresponding simple organo-metallic compounds are not.

The invention may be illustrated by the following examples:

Example I 500 gms. of high-grade naphthalene boiling at 216–218° C. and 74 gms. of sodium metal were heated in a steel bomb at 255–273° C. for 19 hours under a hydrogen pressure of about 280 lbs./sq. in. At the end of this time, the reaction mixture was filtered. 87.5% of the original naphthalene was recovered as tetrahydronaphthalene (tetralin) boiling at 204–206° C., by distillation from the filtrate. 10.2% was obtained as a higher boiling polymer of naphthalene. About 85 gms. of solid product having a black appearance was obtained as a residue of the filtration step; this residue is the catalyst of my invention.

About 22 grams of this solid product, or hydrocarbide, was mixed with 123 gms. of naphthalene and the mixture heated and agitated in the bomb at 260° C. for about 12 hours, at a hydrogen pressure of 400–450 lbs./sq. in. At the end of this time the liquid portion, upon separation from the hydrocarbide and distillation, gave 87% of the original naphthalene as tetrahydronaphthalene (tetralin) boiling at 204–206° C.

To show that the solid hydrocarbide was the catalyst, exactly the same conditions as described above for 123 gms. of naphthalene, were used in an attempt to hydrogenate a further 123 gms. of naphthalene, but in the presence of sodium instead of hydrocarbide. However, no tetralin was obtained, instead a polymer of naphthalene having a boiling point higher than either naphthalene or tetralin was formed. Furthermore, no tetralin was obtained when an attempt was made to hydrogenate naphthalene in the presence of this polymer only and under otherwise the same conditions.

The following examination shows that my catalyst contains sodium directly linked to a carbon atom, as in organo-metallic compounds. A portion of the catalyst was subjected to the action of carbon dioxide under 900 lbs./sq. in. pressure at 85° C. for 15 hours in a steel bomb while agitating in a shaking apparatus. The product of the reaction with $CO_2$ was then treated with water and filtered. When the filtrate was treated with dilute mineral acid, an organic acid was precipitated. The precipitate dissolved in $Na_2CO_3$ solution as well as in NaOH solution, which is a test for organic acid as distinguished from phenols and the like.

Small samples of hydrocarbide catalyst, prepared as described above, were withdrawn from the autoclave between successive hydrogenations of naphthalene. The reactivity of these samples toward air and water was determined as follows. After the first hydrogenation, in which the catalyst was prepared, the sample of the catalyst ignited spontaneously in the air and on water, indicating the presence of sodium hydride. After the second hydrogenation, the catalyst would ignite only on water. After the third hydrogenation hydrogen was evolved rapidly when water was added, while from the fourth hydrogenation on, hydrogen was evolved only very slowly, a tarry oil (indicating complex hydrocarbide) being formed from the reaction of the originally finely divided hydrocarbide with water. The activity of the catalyst had not decreased in the least during the disappearance of the sodium hydride.

The following example illustrates the improvement in the activity and efficiency of the catalyst during a continuous process of successive hydrogenation.

Example II 128 gms. of pure naphthalene, boiling at 216–218° C. and 48.3 gms. of sodium were heated for 8 hours at 260–315° C. under a hydrogen pressure of 300 lbs./sq. in. The liquid products were distilled from the hydrocarbides under a vacuum to give the catalyst, which was used in the following successive hydrogenations, during which the liquid product of hydrogenation was distilled off in a vacuum and then more fresh naphthalene added for the next hydrogenation:

| Hydrogenation No. | Temp. °C. | Hydrogen pressure lbs./sq. in. | Duration hours | Naphthalene added grams | Percent yield of tetralin |
|---|---|---|---|---|---|
| 1 | 260 | 300 | 8.8 | 128 | 66.6 |
| 2 | 260 | 300–450 | 7.5 | 131 | 73.1 |
| 3 | 260 | 300 | 6.7 | 128 | 82.0 |
| 4 | 260 | 300 | 8.8 | 125 | 96.0 |

The percentage yield of hydrogenated product increased with each hydrogenation from 66.6% to 82% and finally to 96%. Similar observations have been made with other catalysts of this type.

Example III 178 gms. of anthracene, having a melting point of 204–208° C. and 5.3 gms. of metallic sodium were heated to 120–145° C. for 12 hours under a hydrogen pressure of 500 lbs./sq. in. The liquid products were distilled from the solid hydrocarbide and gave a yield of 48.7% of hexa-hydro-anthracene boiling at 298–307° C. and 40.9% of tetra-hydro-anthracene boiling at 307–322° C. 10.1% of the liquid was obtained as a polymer of anthracene boiling above 322° C.

Example IV

A mixture of 497 gms. acenaphthene boiling at 277° C. and 5 gms. of metallic sodium was heated at 300–450° C. for 11 hours under a hydrogen pressure of 400–455 lbs./sq. in. The products were separated as in Example III. The liquid portion consisted almost entirely of tetra-and deca-hydro-acenaphthenes, while the solid product was chiefly hydrocarbide with some free carbon giving the material a black appearance.

Example V 115 gms. of lubricating oil obtained by distillation of crude petroleum from the mid-continent oil fields which boiled at 210–280° C. and having a Sligh oxidation number of 49.5 was heated with 10 gms. of sodium for 8 hours at 260–375° C. under a hydrogen pressure of 450 lbs./sq. in. The solid product was separated from the reaction mixture by filtration. The hydrocarbide catalyst thus obtained was then used for the following three successive hydrogenations of equal quantities of the same lubricating oil, in the continuous manner described in Example II:

| Hydrogenation No. | Temp. °C. | Hydrogen pressure lbs./sq. in. | Duration hours | Lubricating oil added (in grams) | Sligh oxidation No. of product |
|---|---|---|---|---|---|
| 1 | 260–310 | 450 | 5 | 118 | 9.4 |
| 2 | 260–270 | 415 | 7.5 | 119 | 1.7 |
| 3 | 275 | 425 | 5.5 | 128 | 0.2 |

The Sligh oxidation number of a sample of this same oil heated to 260–310° C. for 5 hours under a hydrogen pressure of 450 lbs./sq. in. and in the absence of hydrocarbide was practically unchanged.

The above examples have been given merely by way of illustration of the invention and I do not wish to be limited to the exact procedure or specific materials given therein, since the catalysts may be prepared by the use of other hydrocarbons, and other alkali metals than sodium, and the hydrocarbide catalysts obtained will vary in composition accordingly. Broadly, the invention comprises the reaction of an alkali metal with a hydrocarbon at a temperature sufficiently high and for a long enough period of time to form complex organo-metallic compositions, and the use of these complex compositions as catalysts in a continuous or discontinuous process for the hydrogenation of organic compounds. The invention also includes the complex organo-metallic compositions as new compositions of matter.

My new catalysts may be used for the hydrogenation of a variety of organic compounds in addition to those given in the examples. However, they are especially applicable for use in the hydrogenation of the hydrocarbon from which they were derived.

Although the use of sodium and sodium hydride as catalysts for the hydrogenation of hydrocarbons has previously been described, the prior methods do not show the conditions necessary to form my new catalysts. Furthermore, a process of hydrogenation of organic compounds, using complex organo-metallic compositions as catalysts was previously unknown. Moreover, it was not known to use such catalysts in a continuous process, and in which the efficiency of the catalyst improves with use without becoming poisoned by impurities such as sulfur compounds.

For the purpose of brevity, I have used the term "hydrocarbide" in this specification and in the appended claims to designate a complex alkali metal derivative of a hydrocarbon polymer, which reacts with carbon dioxide to form the alkalinated salt of an organic acid and which also catalyzes the hydrogenation of unsaturated organic compounds.

I claim:

1. Process for the preparation of an alkali metal hydrocarbide which comprises heating an aromatic hydrocarbon under pressure of hydrogen with an alkali metal at a temperature at which alkali metal causes a polymer of said hydrocarbon to form, continuing the heating at a temperature at which the alkali metal reacts with the polymer to form an alkali metal hydrocarbide until substantial amounts of the hydrocarbide are formed, and separating the hydrocarbide from the reaction mixture, and using the separated hydrocarbide as a catalyst in the hydrogenation of aromatic hydrocarbons.

2. Process for the preparation of an alkali metal hydrocarbide which comprises heating an aromatic hydrocarbon having more than one benzene nucleus under pressure of hydrogen with an alkali metal at a temperature at which alkali metal causes a polymer of said hydrocarbon to form, continuing the heating at a temperature at which the alkali metal reacts with the polymer to form an alkali metal hydrocarbide until substantial amounts of the hydrocarbide are formed, and separating the hydrocarbide from the reaction mixture, and using the separated hydrocarbide as a catalyst in the hydrogenation of aromatic hydrocarbons.

3. Process for the preparation of sodium hydrocarbide which comprises heating a hydrocarbon having more than one benzene nucleus under pressure of hydrogen with sodium at a temperature at which sodium causes a polymer of said hydrocarbon to form, continuing the heating at a temperature at which the sodium reacts with the polymer to form sodium hydrocarbide until substantial amounts of the hydrocarbide are formed, and separating the hydrocarbide from the reaction mixture, and using the separated hydrocarbide as a catalyst in the hydrogenation of aromatic hydrocarbons.

4. Process for the preparation of an alkali metal hydrocarbide which comprises heating naphthalene under pressure of hydrogen with an alkali metal at a temperature at which alkali metal causes a polymer of naphthalene to form, and thereafter heating said polymer in contact with alkali metal at a temperature at which the alkali metal reacts with the polymer to form an alkali metal hydrocarbide until substantial amounts of the hydrocarbide are formed, and separating the hydrocarbide from the reaction mixture, and using the separated hydrocarbide as a catalyst in the hydrogenation of aromatic hydrocarbons.

5. Process for the preparation of sodium hydrocarbide which comprises heating naphthalene under pressure of hydrogen with sodium at a temperature at which sodium causes a polymer of naphthalene to form, and thereafter heating said polymer in contact with sodium at a temperature at which the sodium reacts with the polymer to form sodium hydrocarbide until substantial amounts of the hydrocarbide are formed, and separating the hydrocarbide from the reaction mixture, and using the separated hydrocarbide as a catalyst in the hydrogenation of aromatic hydrocarbons.

6. Process for the preparation of an alkali metal hydrocarbide which comprises heating naphthalene under pressure of hydrogen with an alkali metal above about 250° C. to form a polymer of naphthalene and thereafter heating said polymer in contact with alkali metal at a temperature at which the alkali metal reacts with the polymer to form an alkali metal hydrocarbide until substantial amounts of the hydrocarbide are formed, and separating the hydrocarbide from the reaction mixture, and using the separated hydrocarbide as a catalyst in the hydrogenation of aromatic hydrocarbons.

7. Process for the preparation of sodium hydrocarbide which comprises heating naphthalene under pressure of hydrogen with sodium above about 250° C. to form a polymer of naphthalene and thereafter continuing the heating until substantial amounts of the hydrocarbide are formed, and separating the hydrocarbide from the reaction mixture, and using the separated hydrocarbide as a catalyst in the hydrogenation of aromatic hydrocarbons.

8. A catalyst for the hydrogenation of organic compounds comprising essentially the sodium hydrocarbide of acenaphthene.

9. Process for the hydrogenation of organic compounds comprising reacting an unsaturated hydrocarbon with hydrogen in the presence of an alkali metal hydrocarbide, separating the hydrogenated product from the hydrocarbide, adding fresh quantities of said unsaturated hydrocarbon and continuing the process.

10. Process for the hydrogenation of an aromatic hydrocarbon having more than one benzene nucleus comprising reacting said hydrocarbon with hydrogen in the presence of an alkali metal hydrocarbide, separating the hydrogenated product from the hydrocarbide, adding fresh quantities of said hydrocarbon and continuing the process.

11. Process for the hydrogenation of acenaphthene comprising reacting acenaphthene with hydrogen in the presence of an alkali metal hydrocarbide of acenaphthene.

ANTHONY M. MUCKENFUSS.